United States Patent [19]

Song

[11] Patent Number: 5,467,338
[45] Date of Patent: Nov. 14, 1995

[54] DISK CHUCKING APPARATUS OF A DISK PLAYER

[75] Inventor: Kiseok Song, Seoul, Rep. of Korea

[73] Assignee: Daewoo Electronics Co., Ltd., Seoul, Rep. of Korea

[21] Appl. No.: 157,481

[22] Filed: Nov. 26, 1993

[30] Foreign Application Priority Data

Nov. 30, 1992 [KR] Rep. of Korea ............. 92-23988

[51] Int. Cl.⁶ .................................................. G11B 23/00
[52] U.S. Cl. .................................................. 369/270
[58] Field of Search ........................ 369/36, 270, 271, 369/75.2, 282, 263, 290; 360/99.12

[56] References Cited

U.S. PATENT DOCUMENTS

| | | | |
|---|---|---|---|
| 4,466,033 | 8/1984 | Jordan et al. | 360/99.05 |
| 4,536,865 | 8/1985 | Kenmostu et al. | 369/75.2 |
| 4,705,279 | 11/1987 | Mizukami et al. | 369/271 |

FOREIGN PATENT DOCUMENTS 62-277657  12/1987  Japan ..................... 369/270

Primary Examiner—John H. Wolff
Assistant Examiner—Allen Cao
Attorney, Agent, or Firm—Nixon & Vanderhye

[57] ABSTRACT

A disk chucking apparatus of a disk player comprises a chucking plate including a cylindrical hollow portion at the bottom thereof, a tapered surface formed around the outer peripheral surface of the hollow portion and a protrusion formed at the lowest end of the tapered surface. A clamping ring is movably fitted around the tapered surface and supported by the protrusion. A turntable includes a compartment at the center portion thereof and a lifting ring for lifting the clamping ring. A head is located in the compartment and connected to a spindle motor via a shaft. A sliding ring is slidably fitted with the head; and a spring is located under the sliding ring. The chucking plate and the turntable are made of plastic materials. The disk chucking apparatus avoids an abrupt impact on the disk as the chucking plate is gradually engaged with the turntable with a regular pressure, thereby to achieve a stable chucking operation.

3 Claims, 3 Drawing Sheets

DISK CHUCKING APPARATUS OF A DISK PLAYER

BACKGROUND OF THE INVENTION

1. Field of the Invention

The present invention relates to a disk chucking apparatus of a disk player, and more particularly to a disk chucking apparatus of a disk player in which a chucking plate is gradually engaged with a turntable so as to decrease an impact force on a disk mounted on the turntable during a chucking operation, thereby reduction in weight of the entire arrangement and stable chucking operation can be attained.

2. Description of the Prior Art

Generally, a disk chucking apparatus is applied to chuck a disk mounted on a turntable so that a pickup can implement a stable tracking operation. The prior art regarding such a disk chucking apparatus has been proposed in U.S. Pat. No. 4,509,157 granted to Kaoru Morinage. The disk chucking apparatus disclosed in the above U.S. Patent comprises a turntable, disk chucking means for chucking a disk mounted on said mintable and supporting means for supporting said disk chucking Said disk chucking means are provided with a permanent magnet and said supporting means are provided with windings. Accordingly, the disk chucking means chuck the disk on the turntable by a repulsive force which acts between the permanent magnet and the windings when a constant electric current flows through the windings.

Another conventional disk chucking apparatus is disclosed in U.S. Pat. No. 4,498,161 allowed to Kurt Eisemann. Such chucking apparatus comprises a turntable, a disk centering member, a stop ring, a coil spring and a disk loader provided with said spring the with wherein a disk mounted on said turntable is chucked by said disk loader on which a resilient force of said spring acts.

In such a structure, however, the disk chucking apparatus of the disk player suffers unavoidably from an abrupt impact on the disk and high production cost by using the permanent magnet. Also, an increase of a load on a spindle motor is another problem.

SUMMARY OF THE INVENTION

It is an object of the present invention to provide a disk chucking apparatus of a disk player in which an impact on a disk may be avoided by a gradual engagement of a chucking plate with a turntable.

Another object of the present invention is to provide a disk chucking apparatus of a disk player in which a mintable and a chucking plate are rode of plastic materials, thereby to achieve reduction in weight of the disk player.

In order to accomplish the above objects, a disk chucking apparatus of a disk player in accordance with the present invention comprises a chucking plate including a cylindrical hollow portion at the bottom thereof, a tapered surface formed around the outer peripheral surface of said hollow portion and a protrusion formed at the lowest end of said tapered surface; a clamping ring movably fitted around said tapered surface and supported by said protrusion, said clamping ring being attached thereunder a rubber ring so as to reduce an impact force on a disk when chucking operation being implemented; a turntable including a compartment at the center portion thereof to receive said tapered surface of said chucking plate and lifting means for lifting said clamping ring; a head located in said compartment and connected to a spindle motor via shaft; a sliding ring slidably fitted with said head; and a spring located under said sliding ring so as to absorb an impact force on said turntable, said chucking plate and said turntable being made of plastic materials.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
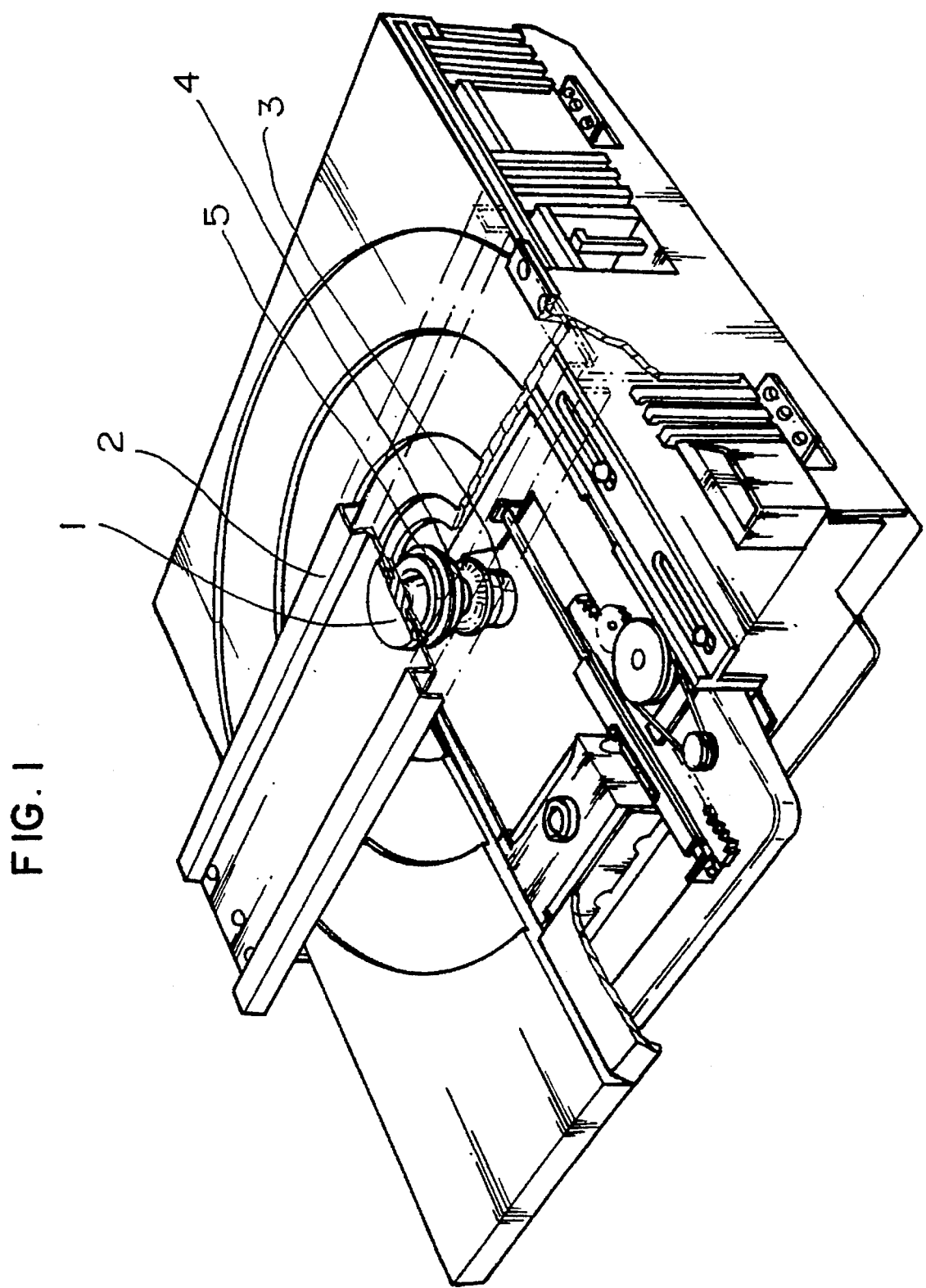
FIG. 1 is a schematic perspective view showing a disk chucking apparatus of a disk player according to the present invention.

FIG. 1 shows a disk chucking apparatus of a disk player according to the present invention, wherein a chucking arm 2, a chucking plate 1 and a turntable 4 are incorporated.

Figure 2:
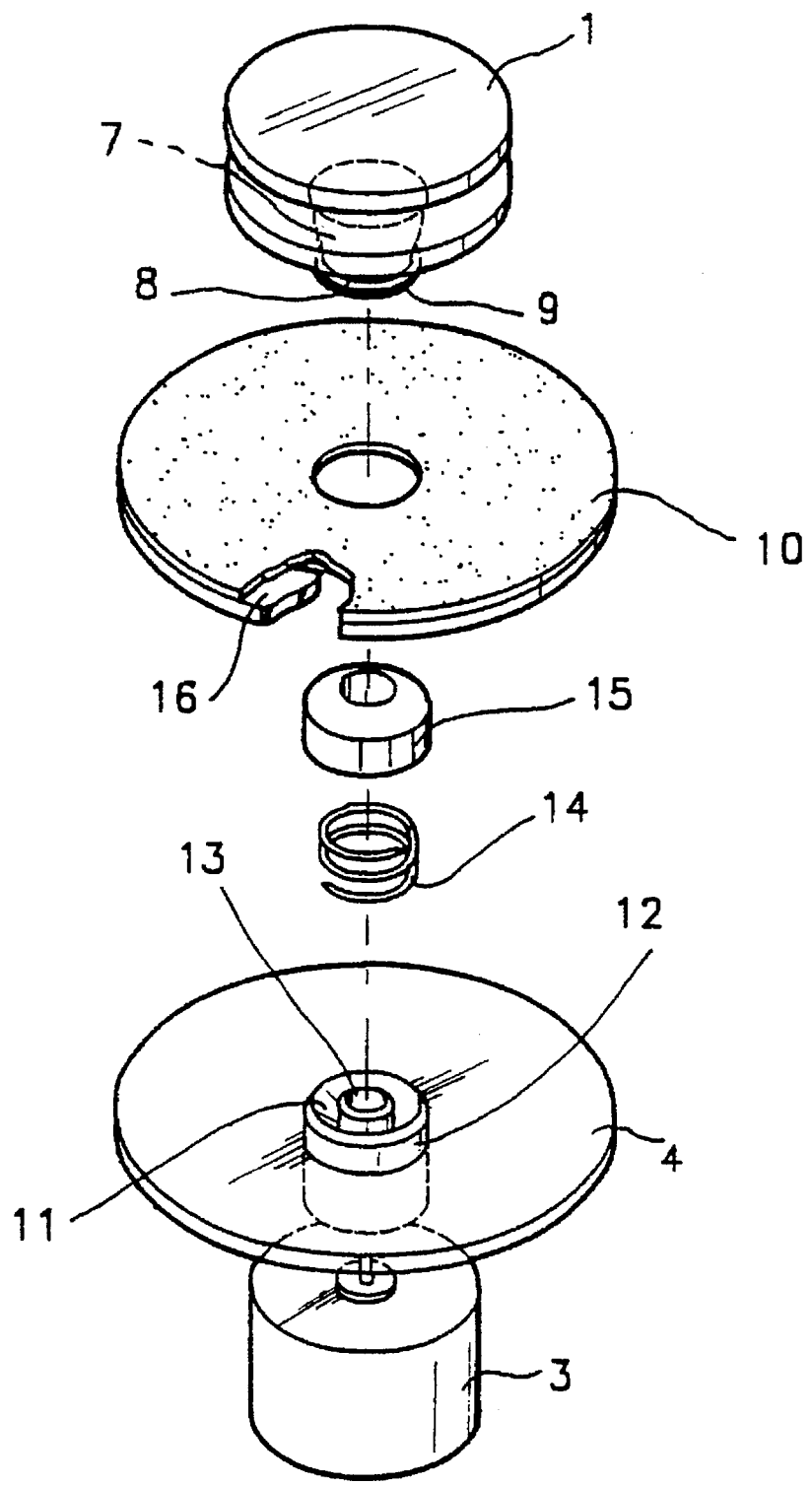
FIG. 2 is an exploded perspective view showing a disk chucking apparatus according to the present invention.

Referring to FIG. 2, a cylindrical hollow portion 7 is formed at the bottom of a chucking plate 1 and a tapered surface 8 is formed around the outer peripheral surface of the hollow portion 7. The tapered surface 8 has a protrusion 9 at the lowest end thereof to movably support a clamping ring 10 under which a rubber ring 16 is attached to obtain a smooth contact with a disk 5 mounted on a turntable 4. Said turntable 4 is provided with a cylindrical compartment 11 at the center portion thereof to receive said tapered surface 8 of said chucking plate 1. Lifting means 12 for lifting said clamping ring 10 protrude upwardly from the wall of said compartment 11 of the mintable 4. A shaft 6 is connected to a spindle motor 3 at one end thereof and at the other end thereof to a head 13 located in said compartment 11 through the bottom of said compartment 11. A sliding ring 15 is slidably fined with said head 13 so that it may compress a spring 14 located thereunder and absorb an impact force on the turntable 4 during the operation of said chucking plate 1.

According to the present invention, the turntable 4 and the chucking plate 1 are made of plastic materials so as to reduce overall weight of the chucking apparatus and of allow the tapered ring 8 to compress inwardly upon the lift of the clamping ring 10.

Figure 3:
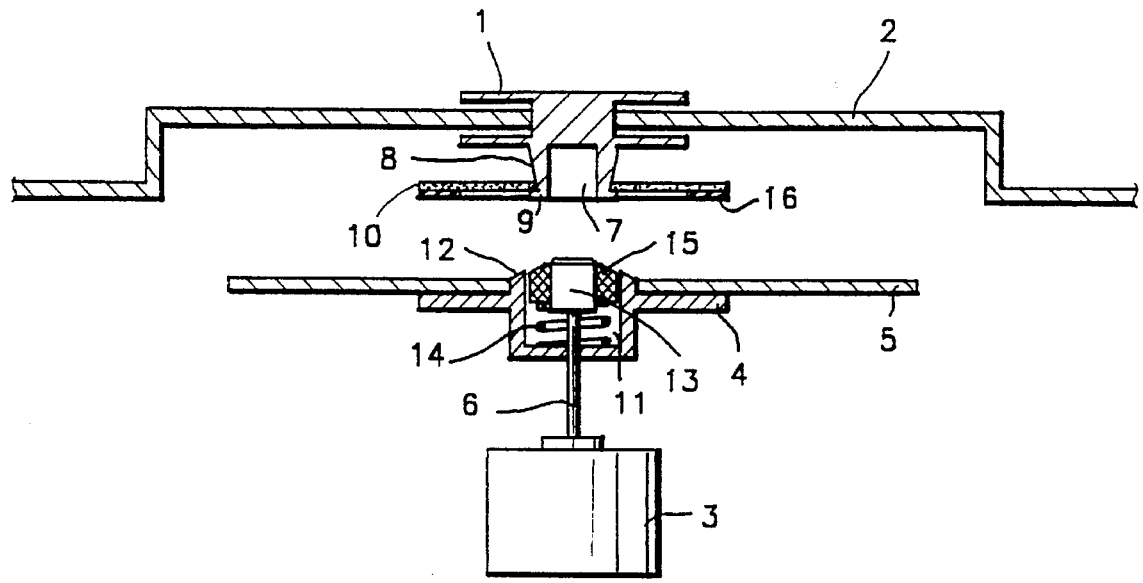
FIG. 3 is a vertical sectional view showing that a disk chucking apparatus is separated from a turntable.
Figure 4:
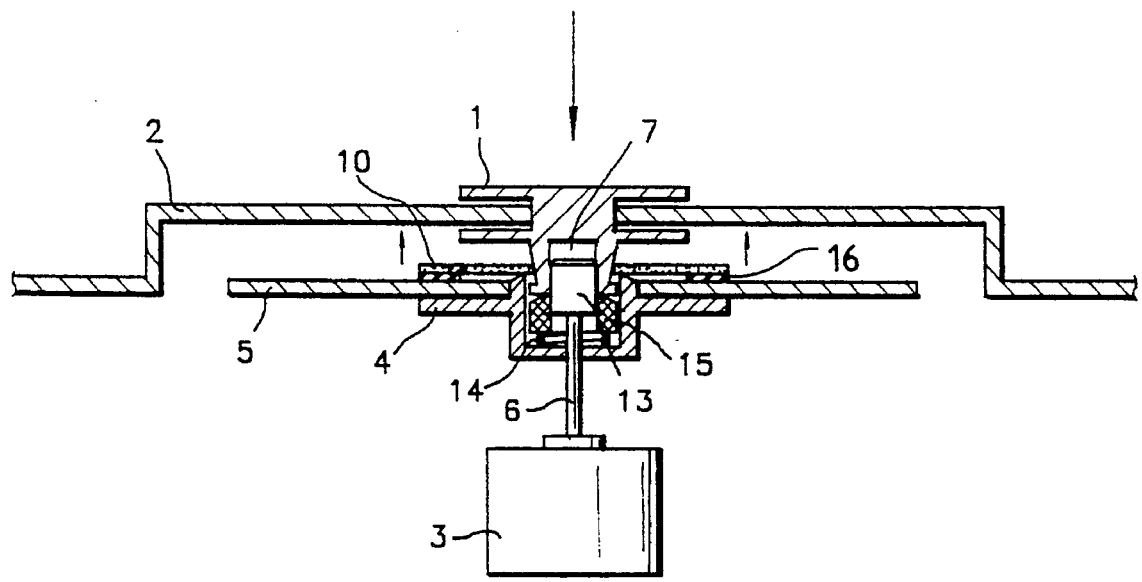
FIG. 4 is a vertical sectional view showing that a disk chucking apparatus is engaged with a turntable.

Hereinafter, the operations of the chucking apparatus according m the present invention will be described With reference to FIGS. 3 and 4. FIG. 3 shows an initial status wherein the chucking plate 1 is separated from the turntable 4, and FIG. 4 shows an operative status wherein the chucking plate 1 is engaged with said turntable 4. As shown by arrows in FIG. 4, the chucking plate 1 descends toward the turntable 4, and the spindle motor 3 and said turntable 4 on which a disk 5 is mounted are simultaneously elevated toward the chucking plate 1 so that the lifting means 12 may press upwardly the lower surface of the clamping ring 10, whereby said clamping ring 10 slides upwardly along the tapered surface 8 of the chucking plate 1, and the head 13 connected to the shaft 6 is inserted into the hollow portion 7 of the chucking plate 1. As the rigid clamping ring 10 ascends along the tapered surface 8, the flexible tapered surface 8 is compressed inwardly to clamp the head 13 inserted therein and the head 13 is held in the tapered surface 8. During this operation, the sliding ring 15 abutted with the protrusion 9 of the tapered surface 8 descends in accordance with the descent of the chucking plate 1, compressing the spring 14 located thereunder, and then the rubber ring 16 attached to the lower surface of the clamping ring 10 comes into gradual contact with the disk 5 mounted on the turntable 4, thereby to decrease an impact force affecting on the disk 5.

When releasing the engagement of the chucking plate 1 from the turntable 4, said chucking plate 1 and said mintable 4 move in the opposite direction, and then the spring 4 compressed under the sliding ring 15 is recovered to press said sliding ting 15 and the protrusion 9 of the chucking plate 1 upwardly, thereby to smoothly release the head 13 from the clamping of the tapered surface 8 of the chucking plate 1.

As apparent from the above description, the disk chucking apparatus of the disk player according to the present invention may avoid an abrupt impact on the disk as the chucking plate is gradually engaged with the mintable with a regular pressure. It is also possible to reduce manufacturing cost not using a permanent magnet. Further, the invention enables the overall apparatus to be compact and light by using the turntable and the chucking plate made of plastic materials. In addition, it is possible to reduce the waste of electric power by virtue of decreasing a lead on the spindle motor.

What is claimed is:

1. A disk chucking apparatus of a disk player, said disk chucking apparatus comprising:

a chucking plate including a cylindrical hollow portion at the bottom thereof, a tapered surface formed around the outer peripheral surface of said hollow portion and a protrusion formed at a lowest end of said tapered surface;

a clamping ring movably fitted around said tapered surface and supported by said protrusion, said clamping ring having a rubber ring attached thereunder to contact a disk when performing a chucking operation;

a turntable including a compartment at the center portion thereof to receive said tapered surface of said chucking plate and lifting means for lifting said clamping ring;

a head located in said compartment and connected to a spindle motor via a shaft;

a sliding ring slidably fitted with said head; and a spring located under said sliding ring so as to absorb an impact force on said turntable.

2. The disk chucking apparatus as claimed in claim 1, wherein said chucking plate and said turntable are comprised of plastic materials.

3. The disk chucking apparatus as claimed in claim 1, wherein said lifting means protrude upwardly from the wall of said compartment.

* * * * *